US011598755B2

(12) United States Patent
Jensen et al.

(10) Patent No.: US 11,598,755 B2
(45) Date of Patent: Mar. 7, 2023

(54) TECHNIQUES FOR EVALUATING ANALYTICAL INSTRUMENT PERFORMANCE

(71) Applicant: WATERS TECHNOLOGIES IRELAND LIMITED, Dublin (IE)

(72) Inventors: Christopher Jensen, Coventry, CT (US); Rong Xie, Hudson, MA (US); James Henriksen, Franklin, MA (US); Kenneth Perregaux, Upton, MA (US); Steven M. Cohn, Franklin, MA (US); Amy Danziger, Marlborough, MA (US)

(73) Assignee: WATERS TECHNOLOGIES IRELAND LIMITED, Dublin (IE)

( * ) Notice: Subject to any disclaimer, the term of this patent is extended or adjusted under 35 U.S.C. 154(b) by 655 days.

(21) Appl. No.: 16/689,767

(22) Filed: Nov. 20, 2019

(65) Prior Publication Data
US 2020/0158697 A1    May 21, 2020

Related U.S. Application Data

(60) Provisional application No. 62/770,426, filed on Nov. 21, 2018.

(51) Int. Cl.
*G01N 30/16* (2006.01)
*G01N 30/72* (2006.01)
(Continued)

(52) U.S. Cl.
CPC .......... *G01N 30/16* (2013.01); *G01N 27/623* (2021.01); *G01N 30/7233* (2013.01); *G01N 35/00623* (2013.01); *G01N 35/00712* (2013.01); *H01J 49/26* (2013.01); *G01N 2030/025* (2013.01); *G01N 2030/027* (2013.01)

(58) Field of Classification Search
CPC .............. G01N 30/16; G01N 30/7233; G01N 35/00623; G01N 35/00712; G01N 27/622; G01N 2030/025; H01J 49/26
See application file for complete search history.

(56) References Cited

U.S. PATENT DOCUMENTS 9,442,098 B2    9/2016  Thorson et al.
2015/0233873 A1    8/2015  Yanagisawa
2020/0342962 A1*  10/2020  Menhardt .............. G16H 10/40

FOREIGN PATENT DOCUMENTS

EP    0622632 A2    11/1994

OTHER PUBLICATIONS

International Search Report and Written Opinion for International application No. PCT/IB2019/060002, dated Feb. 10, 2020, 11 pages.

* cited by examiner

*Primary Examiner* — Nicole M Ippolito
(74) *Attorney, Agent, or Firm* — Goodwin Procter LLP

(57) ABSTRACT

Techniques and apparatus for evaluating analytical device performance and data quality are described. In one embodiment, for example, an apparatus may include at least one memory, and logic coupled to the at least one memory. The logic may be configured to generate an analysis method to be performed by an analytical device, the analysis method comprising a plurality of method segments comprising at least one performance assessment process and at least one sample analysis process, and link the at least one performance assessment process with the at least one sample analysis process. Other embodiments are described.

18 Claims, 9 Drawing Sheets

(51) Int. Cl.
*H01J 49/26* (2006.01)
*G01N 35/00* (2006.01)
*G01N 27/62* (2021.01)
*G01N 27/623* (2021.01)
*G01N 30/02* (2006.01)

TECHNIQUES FOR EVALUATING ANALYTICAL INSTRUMENT PERFORMANCE

CROSS-REFERENCE TO RELATED APPLICATIONS

This application claims the benefit of and priority to U.S. Provisional Patent Application No. 62/770,426, filed on Nov. 21, 2018, the entire contents of which are incorporated by reference.

TECHNICAL FIELD

Embodiments herein generally relate to managing analytical instruments, and, more particularly, to processes for assessing the quality of data generated by analytical instruments.

BACKGROUND

The performance of analytical instruments is continually monitored to ensure data quality. For example, analytical instrument operators may perform various maintenance operations, system calibrations, and/or quality control checks in an attempt to achieve proper system operation. Mass spectrometry (MS) and/or liquid chromatography-mass spectrometry (LC-MS) analytical systems are capable of providing detailed characterization of complex sample sets, including biological matrices, food and environment (F&E) materials, pharmaceutical compounds, metabolic pathway analyses, and/or the like. However, the ability to perform analyses to obtain precise, detailed analytical data, including at low concentrations, causes MS and LC-MS systems to be susceptible to operational instability and data quality issues, particularly over long analysis runs.

In conventional MS and LC-MS systems, quality control measures to ensure proper analytical device operation, such as system suitability tests, are generally performed prior to initiating a sample analysis process. Therefore, such measures may not detect issues that occur during subsequent performance of a sample analysis method. During sample analysis, other quality control measures may be used to calibrate and/or measure analytical device responses for known compounds. Typically, the entire sample run has been completed before an operator learns that the quality control results and, for a failed quality control test, that the integrity of the data is suspect. Accordingly, validation of data quality for analytical devices may benefit from a dynamic assessment process capable of providing meaningful data quality indicators during multiple, configurable segments of a sample analysis method.

SUMMARY

In accordance with various aspects of the described embodiments is an apparatus that may include at least one memory and logic coupled to the at least one memory. The logic may be configured to generate an analysis method to be performed by an analytical device, the analysis method comprising a plurality of method segments comprising at least one performance assessment process and at least one sample analysis process, and link the at least one performance assessment process with the at least one sample analysis process.

In some embodiments of the apparatus, the at least one analytical instrument may include at least one of a liquid chromatography (LC) system, a gas chromatography (GC) system, a mass analyzer system, a mass spectrometer (MS) system, an ion mobility spectrometer (IMS) system, a high-performance liquid chromatography (HPLC) system, a ultra-performance liquid chromatography (UPLC) system, a ultra-high performance liquid chromatography (UHPLC) system, or any combination thereof. In exemplary embodiments of the apparatus, the analytical device may include one of an MS system or an LC-MS system. In various embodiments of the apparatus, the at least one sample analysis process may include a sample injection. In some embodiments of the apparatus, the at least one performance assessment process may include a system suitability test.

In various embodiments of the apparatus, the analysis method may include a plurality of paths. In exemplary embodiments of the apparatus, the logic may determine one of the plurality of paths for execution by the analytical device based on results of the at least one performance assessment process.

In exemplary embodiments of the apparatus, the logic may cause an exception event responsive to the at least one performance assessment process being outside of a threshold. In various embodiments of the apparatus, the logic may prevent generation or access to data of the at least one sample analysis processes linked to the exception event. In exemplary embodiments of the apparatus, the logic may cause the analytical device to enter a fail state responsive to the exception event being a critical level exception. In various embodiments of the apparatus, the logic may proceed with the method and prevent generation or access to data of the at least one sample analysis processes linked to the exception event responsive to the exception event being a non-critical level exception. In some embodiments of the apparatus, the logic may re-run the at least one performance assessment process associated with the exception event responsive to the exception event being a non-critical level exception.

In accordance with various aspects of the described embodiments is a method that may include generating an analysis method to be performed by an analytical device, the analysis method comprising a plurality of method segments comprising at least one performance assessment process and at least one sample analysis process, and linking the at least one performance assessment process with the at least one sample analysis process.

In some embodiments of the method, the at least one analytical instrument may include at least one of an LC system, a GC system, a mass analyzer system, an MS system, an IMS system, an HPLC system, a UPLC system, a UHPLC system, or any combination thereof. In exemplary embodiments of the method, the analytical device may include one of an MS system or an LC-MS system. In various embodiments of the method, the at least one sample analysis process may include a sample injection. In some embodiments of the method, the at least one performance assessment process may include a system suitability test.

In some embodiments of the method, the analysis method may include a plurality of paths. In some embodiments, the method may include determining one of the plurality of paths for execution by the analytical device based on results of the at least one performance assessment process.

In various embodiments, the method may include causing an exception event responsive to the at least one performance assessment process being outside of a threshold. In some embodiments, the method may include preventing generation or access to data of the at least one sample analysis processes linked to the exception event. In various embodiments, the method may include causing the analytical device to enter a fail state responsive to the exception event being a critical level exception. In exemplary embodiments, the method may include proceeding with the method and prevent generation or access to data of the at least one sample analysis processes linked to the exception event responsive to the exception event being a non-critical level exception. In various embodiments, the method may include re-running the at least one performance assessment process associated with the exception event responsive to the exception event being a non-critical level exception.

DETAILED DESCRIPTION

Figure 1:
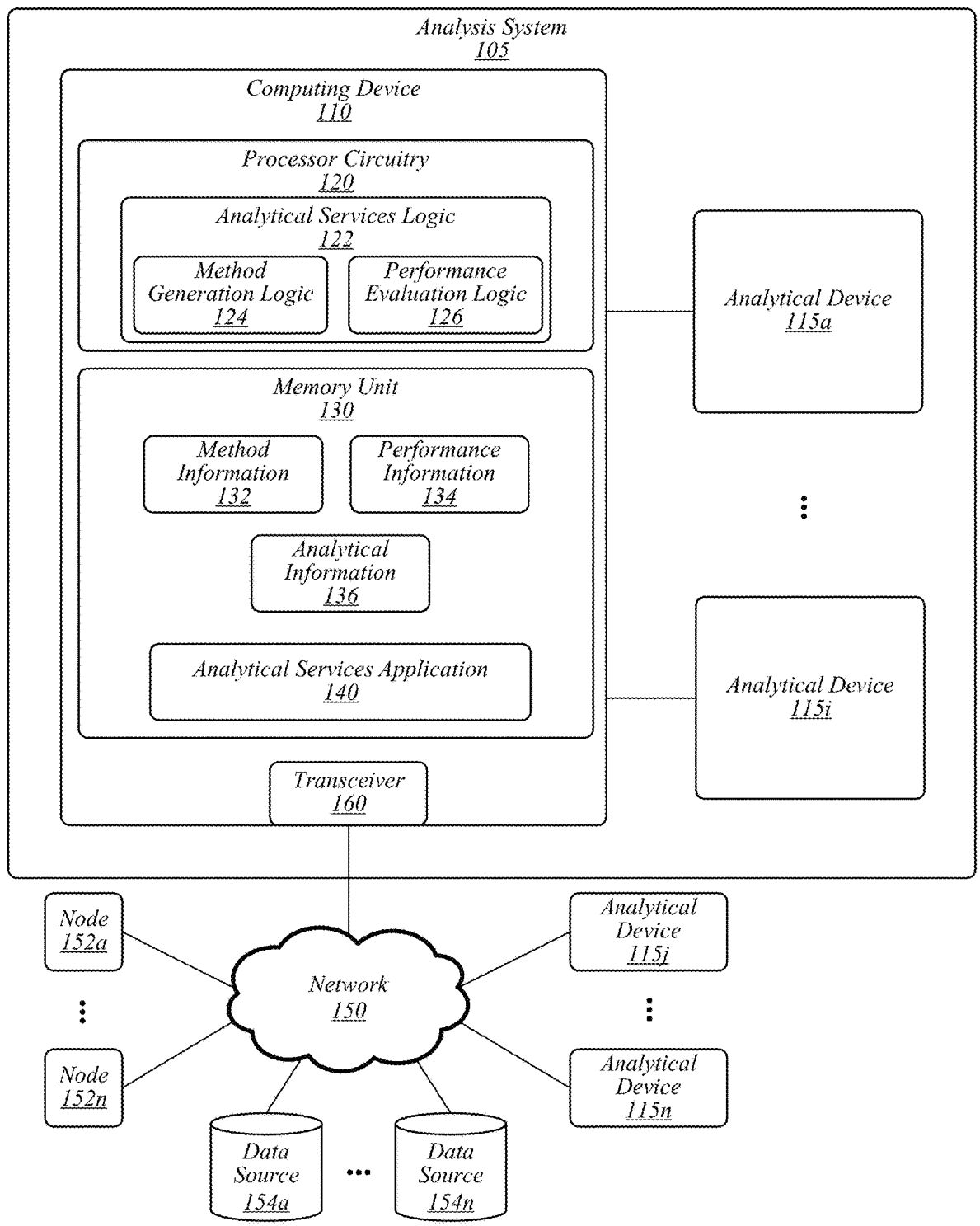
FIG. 1 illustrates an embodiment of a first operating environment.

Various embodiments may generally be directed toward systems, methods, and/or apparatus for determining data quality for an analytical instrument. In some embodiments, a dynamic data quality assessment process may operate to process each sample (for instance, analysis sample or quality control sample) in real-time or substantially real-time and determine whether the sample is within expected limits. In various embodiments, if the sample is not within expected limits, an exception event may be initiated. In exemplary embodiments, an analysis method may be paused, canceled, aborted, stopped, or otherwise modified responsive to an exception event. For example, an exception event may cause an analytical device to enter a fail state and pause the analysis method being executed via the analytical instrument. The analytical device (for example, via a controller, control logic, software, and/or the like) and/or an operator may evaluate the exception event and determine a cause of action, such as continuing the analysis method, re-running all or part of the analysis method (for example, a failed quality control (QC) sample), modifying the analysis method (for example, continue in a different concentration range, proceed down a different method path), and/or the like. In some embodiments, exception events may be categorized as a "critical level exception" (for instance, a system-level failure indicating that the analytical instrument is not functioning properly or otherwise is not suitable to perform a method) or a "non-critical level exception" (for instance, a an failure in processing or other functions that do not indicate bad quality data).

In various embodiments, the data quality assessment process may be or may include one or more performance assessment processes including, without limitation, QC checks, calibration, analytical device validation, analytical device qualification, method validation, method qualification, system suitability tests, and/or combinations thereof, and/or the like. In some embodiments, one or more performance assessment processes may be included within one or more segments of an analytical method. For example, in various embodiments, an operator may select an analysis method and/or create an analysis method using a method editor. The analysis method may be created or modified to include various sample analysis processes, performance assessment processes, and/or portions thereof during one or more method segments. For example, in some embodiments, an analytical device may be or may include a mass spectrometer (MS). An analysis method having sample analysis processes (for instance, sample injections) and performance assessment processes according to some embodiments may be performed using the MS such that each injection is processed immediately after being acquired. In various embodiments, if an injection is out-of-spec, then the run may be paused and the operator and/or analytical device can make a decision to continue, rerun the injection, modify the run, and/or the like. Embodiments are not limited in this context.

In various embodiments, a performance assessment process may be or may include a system suitability test for example an analytical device or system. Non-limiting examples of an analytical device or system may include a liquid chromatography (LC) system, a gas chromatography (GC) system, a mass analyzer system, a mass detector system, a mass spectrometer (MS) system, an ion mobility spectrometer (IMS) system, a high-performance liquid chromatography (HPLC) system, a ultra-performance liquid chromatography (UPLC) system, a ultra-high performance liquid chromatography (UHPLC) system, an ultraviolet (UV) detector, a visible light detector, a solid-phase extraction system, a sample preparation system, a capillary electrophoresis instrument, combinations thereof, components thereof, variations thereof, and/or the like. Although LC, MS, and LC-MS are used in examples in this detailed description, embodiments are not so limited, as other analytical instruments capable of operating according to some embodiments are contemplated herein In general, system suitability tests are intended to verify the proper function of an analytical device to generate analytical measurements. For example, a system suitability test for an LC-MS system may operate to ensure that the functional aspects of the LC-MS system, such as the instrument components, chemistry, software, and/or the like, are working properly to ensure accurate results. An MS and/or LC-MS system suitability test may include various individual tests and/or parameters including, without limitation, peak characteristics, quantitative values on peak shapes, column retention, resolution between peaks, calculations between injections to verify precision, peak area statistics across multiple injections, intensity, sensitivity, signal stability, carryover, combinations thereof, variations thereof, and/or the like.

Some embodiments may provide for defining tests at the method-level for an analytical device. For example, in an MS and/or LC-MS system, embodiments may provide for defining which injections line up with which tests. In various embodiments, performance assessment processes (for instance, such as system suitability tests) may be defined at the method-level to provide for a pass/fail assessment. In various embodiments, if a performance assessment process fails and an analytical device enters a fail state, the analytical device (for instance, the software operating the analytical device) may be prevented from generating and/or providing data associated with sample analysis. In this manner, sample data associated with a failed performance assessment process ("failed state sample data") may not be generated and/or made accessible. In various embodiments, failed state sample data may be left in a "raw" or unprocessed state (for instance, not converted to a state readable by an operator, such as a chromatogram or spectra) that may not be readily usable by an operator. In other embodiments, failed state sample data may be "locked" or otherwise made inaccessible (for instance, within a secure data storage location, for example, requiring a password or other authorization to access). In exemplary embodiments, the failed state sample data may be generated and/or made accessible responsive to certain events ("unlocking events"), such as subsequent passage of a performance assessment process, approval by an authorized user, digital signature, and/or the like.

In some embodiments, sample analysis methods may be generated with performance assessment processes defined at the method-level to provide different paths or branches through a method depending on, for example, the result of a performance assessment process. For instance, in various embodiments, a sample analysis method may be defined with a first path if the performance assessment process passes, a second path if a first performance processes fails, a third path if a second performance process fails within a first threshold, and a fourth path if the second performance process fails within a second threshold. Embodiments are not limited in this context. For example, a performance assessment process may be monitored in real-time or substantially real-time and failure of, for example, a system suitability parameter may prevent the operator or the analytical device (for instance, via control software) from running a sample (for instance, a "hard fail") and/or allow the run to complete but prevent the generation of and/or access to processed data.

Apparatuses and processes according to some embodiments may provide for technological advantages over conventional systems. In conventional systems, sample data is generated regardless of a failure of a performance test, such as a quality control check or system suitability test, and, for example, archived. Such data in conventional systems is still accessible despite the quality assurance failure and, therefore, prone to manipulation or other misuse. In addition, conventional analytical systems do not provide efficient and/or effective process to define performance assessment tests at the method-level. For example, conventional analytical systems may allow for a certain level of flagging (for instance, of QC or calibration samples). However, such flagging only provides for rudimentary quality checks and, furthermore, does not allow for quality checks at a method-level that allows for analytical systems to understand the tests they are running and to provide pass/fail validity. Moreover, in conventional systems, quality checks are generally an all-or-nothing process in which an entire batch associated with a failed quality check may be invalid.

Accordingly, embodiments provide for improvements in the operation of analytical systems and/or computing technology configured to operate analytical devices and/or process analytical data. In one non-limiting example of a technological improvement, some embodiments provide for dynamic performance assessment of an analytical system, analytical method, sample analysis, and/or the like at the method-level. In a non-limiting example of a technological improvement, some embodiments may provide for customizable processes that may provide options or otherwise guide a user and/or analytical device (for instance, via control software) to fix errors that occur during an analytical run. In another non-limiting example of a technological improvement, exemplary embodiments may prevent the generation of and/or access to sample data associated with a failed quality assessment process. In a further non-limiting example of a technological improvement, some embodiments may provide for a user and/or analytical device to determine and fix errors (for instance, due to a failed performance assessment process) during performance of an analysis process to potentially save sample data that may be invalid in a conventional system. In another non-limiting example of a technological improvement, embodiments may provide for the generation of methods in which specific sample analysis processes may be linked directly with certain performance assessment processes. In a further non-limiting example of a technological improvement, some embodiments may provide for the generation of methods having a plurality of analysis paths that may be executed depending on, for example, results of performance assessment processes and/or sample analysis processes. These and other technological advantages are provided by apparatuses and methods according to some embodiments.

In this description, numerous specific details, such as component and system configurations, may be set forth in order to provide a more thorough understanding of the described embodiments. It will be appreciated, however, by one skilled in the art, that the described embodiments may be practiced without such specific details. Additionally, some well-known structures, elements, and other features have not been shown in detail, to avoid unnecessarily obscuring the described embodiments.

In the following description, references to "one embodiment," "an embodiment," "example embodiment," "various embodiments," etc., indicate that the embodiment(s) of the technology so described may include particular features, structures, or characteristics, but more than one embodiment may and not every embodiment necessarily does include the particular features, structures, or characteristics. Further, some embodiments may have some, all, or none of the features described for other embodiments.

As used in this description and the claims and unless otherwise specified, the use of the ordinal adjectives "first," "second," "third," etc. to describe an element merely indicate that a particular instance of an element or different instances of like elements are being referred to, and is not intended to imply that the elements so described must be in a particular sequence, either temporally, spatially, in ranking, or in any other manner.

FIG. 1 illustrates an example of an operating environment 100 that may be representative of some embodiments. As shown in FIG. 1, operating environment 100 may include an analysis system 105 operative to manage analytical information associated with analytical device 115*a-n*. In some embodiments, analytical device 115*a-n* may be or may include a chromatography system, a liquid chromatography (LC) system, a gas chromatography (GC) system, a mass analyzer system, a mass detector system, a mass spectrometer (MS) system, an ion mobility spectrometer (IMS) system, a high-performance liquid chromatography (HPLC) system, a ultra-performance liquid chromatography (UPLC) system, a ultra-high performance liquid chromatography (UHPLC) system, an ultraviolet (UV) detector, a visible light detector, a solid-phase extraction system, a sample preparation system, a capillary electrophoresis instrument, combinations thereof, components thereof, variations thereof, and/or the like. Although LC, MS, and LC-MS are used in examples in this detailed description, embodiments are not so limited, as other analytical instruments capable of operating according to some embodiments are contemplated herein.

In some embodiments, analytical device 115*a-n* may operate to perform an analysis and generate analytical information 136. In various embodiments, analytical information 136 may include information, data, files, charts, graphs, images, and/or the like generated by an analytical instrument as a result of performing an analysis method. For example, for an LC-MS system, analytical device 115*a-n* may separate a sample and perform mass analysis on the separated sample according to a specified method to generate analytical information 136 that may include raw or unprocessed data, chromatograms, spectra, peak lists, mass values, retention time values, concentration values, compound identification information, and/or the like. In various embodiments, analytical information 136 may include information resulting from a performance assessment process, such as a system suitability test.

In various embodiments, analysis system 105 may include computing device 110 communicatively coupled to analytical device 115*a-n* or otherwise configured to receive and store analytical information 136 associated with analytical device 115. For example, analytical device 115*a-n* may operate to provide analytical information 136 directly to computing device 110 and/or to a location on a network 150 (for instance, a cloud computing environment) accessible to computing device 110. In some embodiments, computing device 110 may be operative to control, monitor, manage, or otherwise process various operational functions of analytical device 115*a-n*. In some embodiments, computing device 110 may be operative to provide analytical information 136 to a location on a network 150 through a secure or authenticated connection. In some embodiments, computing device 110 may be or may include a stand-alone computing device, such as a personal computer (PC), server, tablet computing device, cloud computing device, and/or the like. In various embodiments, computing device 110 may be or may include a controller or control system integrated into analytical device 115*a-n* to control operational aspects thereof.

As shown in FIG. 1, computing device 110 may include processing circuitry 120, a memory unit 130, and a transceiver 160. Processing circuitry 120 may be communicatively coupled to memory unit 130 and/or transceiver 160.

Processing circuitry 120 may include and/or may access various logic for performing processes according to some embodiments. For instance, processing circuitry 120 may include and/or may access analytical services logic 122, method generation logic 124, and/or performance evaluation logic 126. Processing circuitry and/or analytical services logic 122, method generation logic 124, and/or performance evaluation logic 126, or portions thereof, may be implemented in hardware, software, or a combination thereof. As used in this application, the terms "logic, "component," "layer," "system," "circuitry," "decoder," "encoder," and/or "module" are intended to refer to a computer-related entity, either hardware, a combination of hardware and software, software, or software in execution, examples of which are provided by the exemplary computing architecture 700. For example, a logic, circuitry, or a layer may be and/or may include, but are not limited to, a process running on a processor, a processor, a hard disk drive, multiple storage drives (of optical and/or magnetic storage medium), an object, an executable, a thread of execution, a program, a computer, hardware circuitry, integrated circuits, application specific integrated circuits (ASIC), programmable logic devices (PLD), digital signal processors (DSP), field programmable gate array (FPGA), a system-on-a-chip (SoC), memory units, logic gates, registers, semiconductor device, chips, microchips, chip sets, software components, programs, applications, firmware, software modules, computer code, combinations of any of the foregoing, and/or the like.

Although analytical services logic 122 is depicted in FIG. 1 as being within processing circuitry 120, embodiments are not so limited. In addition, although method generation logic 124 and performance evaluation logic 126 are depicted as being a logic of analytical services logic 122, embodiments are not so limited, as method generation logic 124 and performance evaluation logic 126 may be separate logics and/or may not be standalone logics but, rather, a part of analytical services logic 122. For example, analytical services logic 122, and/or any component thereof, may be located within an accelerator, a processor core, an interface, an individual processor die, implemented entirely as a software application (for instance, analytical services application 140) and/or the like.

Memory unit 130 may include various types of computer-readable storage media and/or systems in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In addition, memory unit 130 may include various types of computer-readable storage media in the form of one or more lower speed memory units, including an internal (or external) hard disk drive (HDD), a magnetic floppy disk drive (FDD), and an optical disk drive to read from or write to a removable optical disk (e.g., a CD-ROM or DVD), a solid state drive (SSD), and/or the like.

Memory unit 130 may store an analytical services application 140 that may operate, alone or in combination with analytical services logic 122, to perform various analytical functions according to some embodiments. In various embodiments, analytical services application 140 may interact with analytical devices 115*a-n* and/or components thereof through various drivers (which may include application programming interfaces (APIs) and/or the like), software and/or hardware interfaces, and/or the like.

In various embodiments, method generation logic 124 may operate to generate analysis methods that may be executed via analytical device 115*a-n*. In exemplary embodiments, the analysis methods may be stored as method information 132. In some embodiments, method generation logic 124 may be or may include a method editor application operative to allow a user and/or analytical services application 140 to generate an analysis method. For example, method generation logic 124 may operate to add/remove/modify method steps, method step details, performance assessment processes, performance assessment process parameters, performance assessment process thresholds or acceptance criteria, performance assessment process exception or failure events, link sample analysis processes with performance assessment processes, and/or the like. In various embodiments, method information 132 may include existing methods and/or portions thereof, for example, that have been verified, qualified, and/or otherwise accepted for use with an analytical device. In some embodiments, the existing methods may include performance assessment processes and/or sample analysis processes for a particular method.

Method generation logic 124 may allow a user to access and modify an existing method to generate a new method. In various embodiments, method generation logic 124 may recommend and/or generate a method based on analysis information, such as the type of analytical device, device settings, analysis type, and/or the like. For example, for an MS or LC-MS analysis, method generation logic 124 may recommend and/or generate a first analysis method with a first set of performance assessment processes and/or sample analysis processes for a proteomic analysis and a second analysis method with a second set of performance processes and/or sample analysis processes for a toxicology analysis. In another example, for an MS or LC-MS analysis, method generation logic 124 may allow a user to generate a method that includes an injection list and a system suitability list that provides a system suitability workflow for the method. Embodiments are not limited in this context.

In some MS or LC-MS embodiments, a user operating an analytical device 115a may provide information regarding the analysis to method generation logic 124, such as the type of compound of interest (for instance, a protein, a pharmaceutical, and/or the like), whether the compound is known or unknown, analysis parameters and/or variables, and/or the like. The method generation logic 124 may generate an analysis method, that may include sample set candidates and performance assessment processes, such as quality control checks, system suitability tests, and/or the like. The suggested sample sets of the analysis method may be submitted as individual batches for acquisition. In some embodiments, the results of the suggested sample sets may be evaluated by a user and/or analytical device (for instance, via control software) to determine the optimal method to use for the particular sample of interest.

In various embodiments, performance evaluation logic 126 may operate to evaluate, assess, check, verify, qualify, or otherwise determine the performance of analytical device 115a-n before, during, and/or after the execution of an analysis method. In some embodiments, performance evaluation logic 126 may manage the performance assessment aspects of an analysis method being executed on analytical device 115a-n. For example, performance evaluation logic 126 may receive performance information 134 in the form of results of a performance assessment process and determine whether an exception event has occurred (for example, if a performance assessment process is out of an expected threshold). In various embodiments, performance information 134 may be accessed from method information 132 (for instance, the system suitability test results from the analytical data of an analysis method). In some embodiments, performance evaluation logic 126 may, responsive to an exception event, trigger a fail state, take a particular path in an analysis method, elicit user input, prevent the generation of and/or access to analytical information 136, provide for a user and/or analytical device (for instance, via control software) to re-run a performance assessment process or other method segment, and/or the like. Embodiments are not limited in this context.

In some embodiments, for an MS and/or LC-MS system, performance evaluation logic 126 may allow an analyst to verify the passage of system suitability parameters so that the analyst may continue processing analytical information 136 to generate accurate results. In various embodiments, performance assessment processes (for instance, system suitability processes) may be added to a method via a method editor (for example, implemented by method generation logic 124). The following Table 1 depicts illustrative system suitability details for a method according to some embodiment:

TABLE 1

| Parameter | Function | Field | Component | Acceptance Criteria |
|---|---|---|---|---|
| A | % RSD | Peak Area | Comp1 | ≤1.00 |
| B | % RSD | Retention Time | Comp1 | ≤1.00 |
| C | | Peak Area | Comp2 | ≥1000 |
| D | | USP Tailing | Comp1 | ≤2.0 |

In Table 1, a parameter may be a tag operative to identify which injection should be included; a function may be a summary calculation to be performed (if left blank, no summary calculation may be performed and the identified field may be used as-is), in some embodiments, functions required for this increment may include % relative standard deviation (RSD) and average; field may be a specific result field used in the summary calculation or placed as-is in the summary table, in some embodiments, fields used for this increment may include peak area, peak height, retention time, tailing (for instance, US Pharmacopeia (USP) tailing), plate count (for example, USP plate count), and/or resolution; and acceptance criteria may be criteria to which the analyst can compare the presented results in the method workflow.

In some embodiments, a column may be added to an injection table for the MS or LC-MS method in which the analyst may indicate which injection will be used for the evaluation of each system suitability parameter. This column may accept tags associated with multiple parameters (for instance, A, B, D of Table 1). In some embodiments, user interface (UI) objects may be used to define the injections and this information may be imported into the sample set from an appropriate field in the analytical information 136.

In various embodiments, the performance assessment processes (for instance, a system suitability workflow) may include the summary information as depicted in the following Table 2 for system suitability parameters, acceptance criteria, and observed values:

TABLE 2

| | Parameter | Acceptance Criteria | Observed Value |
|---|---|---|---|
| A | % RSD, Peak Area, Comp 1 | ≤1.00 | 0.18 |
| B | % RSD, Retention Time, Comp 1 | ≤1.00 | 0.15 |
| C | Peak Area, Comp 2 | ≥1000 | 1598 |
| D | USP Tailing, Comp 1 | ≤2.0 | 1.5 |

In Table 2, a parameter may be a summary of the function, field and/or component selections; acceptance criteria may be a display of the information entered in a method editor, an observed value may include calculated value from selected parameters. In various embodiments, performance evaluation logic 126 may compare the observed value to the acceptance criteria and trigger exception events, display warnings, highlight failures, indicate passage or acceptance, and/or the like.

In various embodiments, non-system suitability field(s) may apply to a defined injection and may be displayed in a summary, such as in the summary of Table 2. In various embodiments, an operator may define certain "standard" fields (for instance, peak area, peak height, retention time, and/or the like) and components in the method. In exemplary embodiments, an operator may define specific injections in the injection list, and view the defined field(s) for the appropriate injection/component in the system suitability so that the operator and/or analytical device 115a-n (for instance, via control software) may verify the value against the system suitability criterion.

In various embodiments, system suitability calculations may be added, for example, as an option for the field selection. For instance, an operator may define "system suitability" fields (for example, USP tailing, USP plate count, resolution, and/or the like) and components in the method, specific injections in the injection list, and/or the like. In exemplary embodiments, an operator may view the defined field(s) for the appropriate injection/component in the system suitability to, among other things, verify the value against system suitability criterion.

In exemplary embodiments, acceptance criteria may be added and defined in the method and displayed in the summary. For example, an operator may add acceptance criteria to system suitability criteria in the method, which may be viewed in a system suitability summary to efficiently visually compare observed values to predefined criteria. In some embodiments, summary calculations may be provided, for example, an operator may define a summary calculation (% RDS and Average) to a selected field and component, and, in addition, define the multiple injections used to complete the calculation. In this manner, summary calculations may be included in the evaluation of system suitability.

In various embodiments, performance information 134 may include information relating to user performance information or statistics. For example, analytical services application 140 may include a set of registered users. Execution of a method and/or portions thereof may be associated with one or more particular users. Method information 132, performance information 134, and/or analytical information 136 may be used to generate user statistics for registered users. For example, in some embodiments, analytical services application 140 may include a user performance application that may allow a user to see the results achieved by a particular user, performance assessment processes associated with a particular user, exception events associated with a particular user, and/or the like. For instance, an administrator may access the user statistics for a first user via a user statistics interface of analytical services application 140. The administrator may be able to determine, for example, the passage rate of system suitability tests associated with the first user, whether the first user has passed data associated with certain system suitability results (for instance, failed or low-confidence system suitability results), which method paths the user has chosen responsive to exception requests, how many exception requests the user is associated with, and/or the like. Embodiments are not limited in this context.

Figure 2:
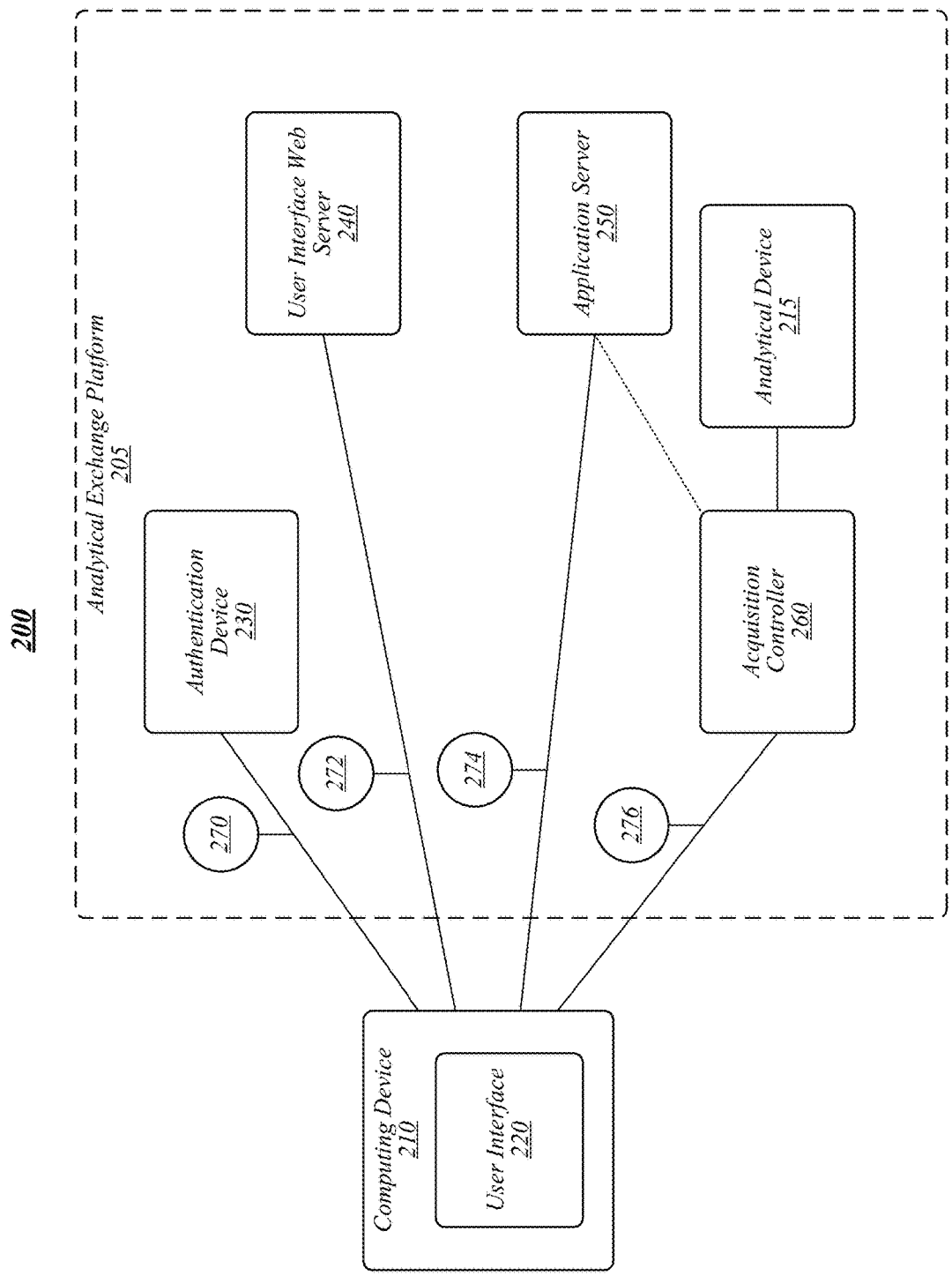
FIG. 2 illustrates an embodiment of a second operating environment.

FIG. 2 illustrates an example of an operating environment 200 that may be representative of some embodiments. As shown in FIG. 2, operating environment 200 may include an an analytical exchange platform (or an analytical instrument platform) 205. In some embodiments, analytical exchange platform 205 may be operative to provide for the exchange of analytical information among interested entities. In various embodiments, analytical exchange platform 205. In exemplary embodiments, analytical exchange platform 205 may be or may include a software platform, suite, set of protocols, and/or the like provided to customers by a manufacturer and/or developer associated with an analytical instrument. A non-limiting example of a developer may be the Waters Corporation of Milford, Mass., United States of America. For example, a developer may provide analytical exchange platform 205 as a data exchange interface for an LC, MS, LC-MS, and/or the like analytical instrument provided to an entity by the developer.

In exemplary embodiments, operating environment 200 may include a computing device 210 operative to display user interface 220 (for instance, executed via an analytical services application 140. In some embodiments, user interface 220 may include a browser application, graphical user interfaces (GUIs), web interfaces, a mobile application ("mobile applications," "mobile apps," or "apps"), and/or the like. Embodiments are not limited in this context. In various embodiments, a user may interact with analytical exchange platform 205 and/or components thereof via user interface 220.

Authentication 270 to analytical exchange platform 205 may be implemented via an authentication device 230. In some embodiments, authentication device 230 may be or may include an identity provider in the form of a third-party entity or computing device implementing authentication services. User interface services 272 may be provided via a user interface web server 240. For example, some or all of the information, objects, and/or the like presented via user interface 220 may be provided via user interface web server 240. In various embodiments, user interface web server 240 may be the user's entry point and interface into the analytical exchange platform 205.

In various embodiments, business logic services 274 may be provided to computing device 210 via an application server 250. In general, business logic services 274 may include database access and services, workflow services, and/or the like. In various embodiments, analytical services application 140 may be executed by application server 250. For example, a server version of analytical services application 140 may be executed by application server 250 and a corresponding client analytical services application 140 may be executed on computing device 210. In some embodiments, a client application may be or may include a web application ("web app" or "app"), remote web client, thin client, and/or the like.

In some embodiments, application server 250 may be operably coupled to acquisition controller 260 to access data generated by analytical device 215. In various embodiments, acquisition controller 260 may operate to send information, events, and/or the like to user interface 220 (for instance, via application server 250) for real-time monitoring and status updates. In various embodiments, acquisition controller 260 may operate to manage the acquisition of data by analytical device 215 (for instance, via an analytical services application). Embodiments are not limited in this context.

In various embodiments, user interface 220 may provide for certain functionality to implement the methodologies of the analytical services application 140. For example, from user interface 220 a user may be notified when data is invalid. In various embodiments, user interface may prevent saving of invalid data. In exemplary embodiments, user interface 220 may allow for saving invalid data, provided that it is designated or otherwise flagged as being invalid. In various embodiments, processes may be provided to validate invalid data, such as sign-off by an authorized user, associating the invalid data with a re-run method segment and/or performance assessment process, and/or the like. In some embodiments, certain invalid data may be able to be corrected, for example, if the invalid data is due to certain types of errors (such as processing errors or other non-system failure errors). In various embodiments, data, methods, reports, or other objects being viewed via user interface 220 may be automatically saved. For example, if a user is viewing data on a first screen displaying data and navigates to a second screen, the data on the first screen will automatically be saved.

Included herein are one or more logic flows representative of exemplary methodologies for performing novel aspects of the disclosed embodiments. While, for purposes of simplicity of explanation, the one or more methodologies shown herein are shown and described as a series of acts, those skilled in the art will understand and appreciate that the methodologies are not limited by the order of acts. Some acts, steps, and/or the like may, in accordance therewith, occur in a different order and/or concurrently with other acts from that shown and described herein. In addition, certain acts, steps, and/or the like may be excluded. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, hardware, or any combination thereof. In software and firmware embodiments, a logic flow may be implemented by computer executable instructions stored on a non-transitory computer readable medium or machine readable medium, such as an optical, magnetic or semiconductor storage. The embodiments are not limited in this context.

Figure 3:
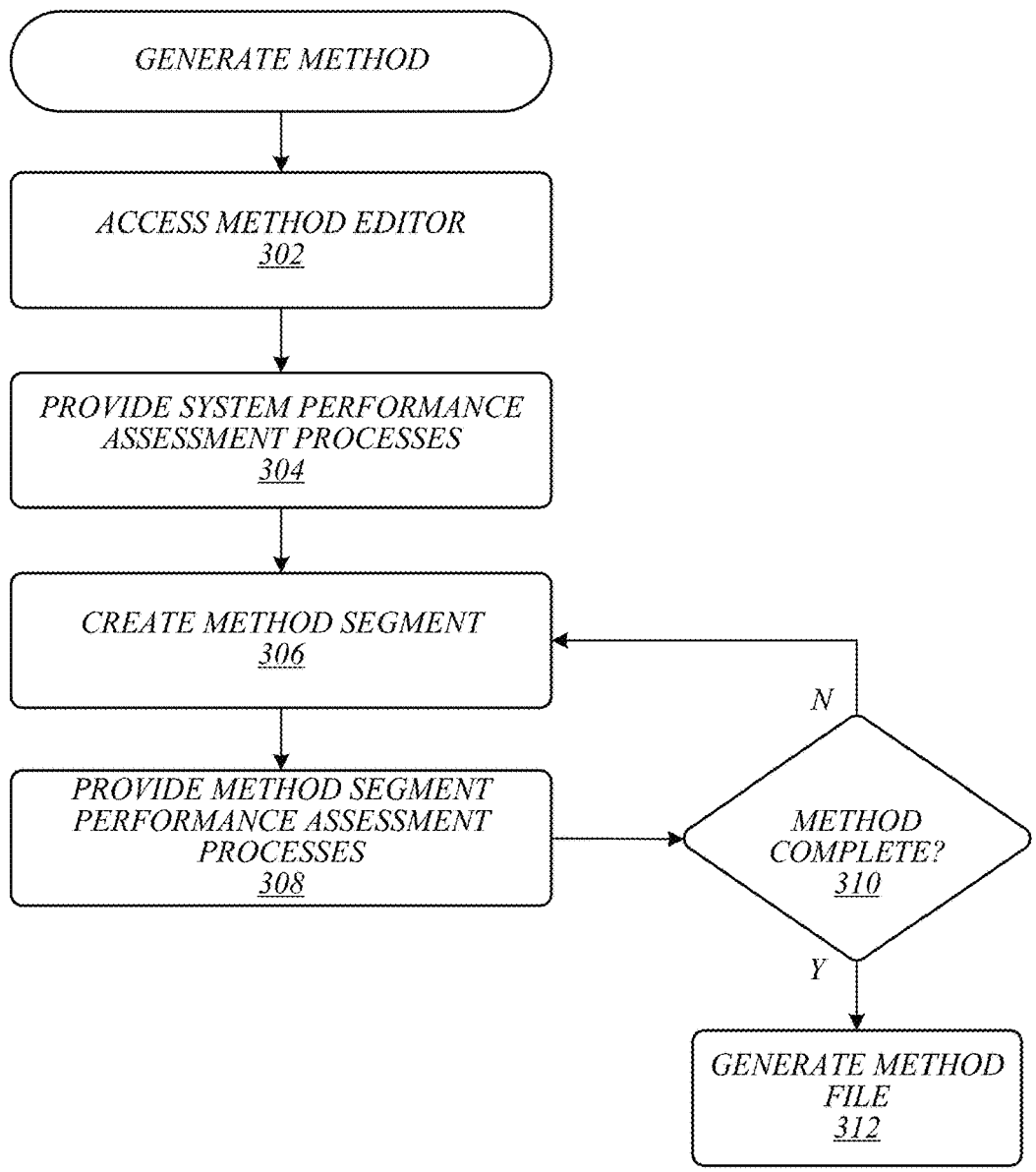
FIG. 3 illustrates an embodiment of a first logic flow.

FIG. 3 illustrates an embodiment of a logic flow 300. Logic flow 300 may be representative of some or all of the operations executed by one or more embodiments described herein, such as computing device 110 and/or components of analytical exchange platform 205. In some embodiments, logic flow 300 may be representative of some or all of the operations of a method generation process.

Logic flow 300 may access a method editor at block 302. In some embodiments, a method editor may include manual and/or automatic entry of method steps, parameters, system assessment processes, and/or the like. In various embodiments, a user may input the type of analysis (for example, a toxicology analysis on an MS system) and the method editor may load a method template, a previously-used method, suggested methods, and/or the like. In some embodiments, a user may modify the loaded method. Embodiments are not limited in this context.

At block 304, logic flow 300 may provide system performance assessment processes. For example, performance assessment processes to evaluate the overall performance of an analytical device may be provided for inclusion in the method. In general, a system performance assessment process may operate to determine whether an analytical device is suitable and working properly to perform the analysis method. In an MS or LC-MS system, a system performance assessment processes may include system suitability tests to determine, for example, whether the MS or LC-MS system is suitable to perform an analysis method. Non-limiting examples of system suitability tests may include tailing, retention time, plate count, resolution, and/or the like. In some embodiments, performance assessment processes may be injection specific. For example, tagging or other indicators may be used to designate and visualize the relationship of an injection to a specific test, for instance, to link the injection to the specific test.

Logic flow 300 may create a method segment at block 306. In general, a method segment may include a discrete portion of a method, including a step, test, analysis, path, branch, user-defined segment, and/or the like. In various embodiments, a method segment may include sample analysis processes (or sample events) associated with analysis of a sample (for instance, a sample injection in an MS or LC-MS system). In exemplary embodiments, a method segment may include test events associated with a performance assessment process. In various embodiments, the method may be generated to link the sample events with the test events. For example, a first test event (for instance, a set of system suitability tests) may be associated with a first set of sample events (for instance, a set of sample injections) and a second test event may be associated with a second set of sample events. Failure of the first test event (for instance, a system suitability test out of range) may affect the first set of sample events (for instance, that method segment may be skipped and/or data may not be generated and/or made available for the associated method segments), but not the second set of sample events.

In some embodiments, a method segment may include other segments. For instance, a method segment may be defined as a path or branch that may include multiple step segments. In an embodiment using an MS or LC-MS system, a segment may include an injection and/or a set or series of injections.

In various embodiments, segments may include conditions for executing the segment. For example, a first segment may have a condition that the system performance assessment processes have passed. In another example, a second segment may have a condition that a particular performance assessment process has passed, while a third segment may have a condition that a particular performance assessment process has failed (for instance, a segment for handling an exception event). In a further example, a fourth segment may have a condition that a sample be within a particular threshold (for instance, to ensure that the analytical instrument is within range to accurately detect or otherwise handle the sample concentration). In various embodiments, a method segment may include steps, paths, branches, and/or the like to handle exception events (for instance, failed performance assessment processes). In exemplary embodiments, a method segment may include data generation, access, and/or processing segments. In this manner, an operator may manage data generation and/or access at the method level.

In various embodiments, a method editor may automatically include default method segments. For instance, certain method segments may be required according to certain protocols and/or the like, such as a quality control check method segment for every specified number of sample analyses. In exemplary embodiments, a method may include hidden and/or uneditable method segments. For example, data generation and/or access method segments may be hidden and/or uneditable. In various embodiments, sample analysis method segments may be separate from data generation and/or access method segments. For example, a first method segment in an MS analysis method may include a plurality of injections. By default, the method editor may include a second method segment in the form of a hidden or uneditable data generation method segment following the first method segment. In this manner, the data generated by analyzing the injections may not be available until after performance of the second method segment. In some embodiments, a third method segment may be included between the first method segment and the second method segment that operates to perform a performance assessment process and the second method segment may have a condition of the third method segment passing the performance assessment process. In this manner, generation and/or access to data associated with the analysis of the injection of the first method segment is reliant on passage of a performance assessment process at the method-level. Embodiments are not limited in this context.

Logic flow 300 may provide method segment performance assessment processes at block 308. For example, performance assessment processes may be assigned to method segments to provide for performance assessment at the method level. In this manner, logic flow 300 may implement dynamic performance assessment in which each analysis step (or method segment) may be processed immediately or substantially immediately and if the analysis step is outside of threshold values, then the method may continue down the appropriate branch (for instance, pausing the run, aborting the run, providing the operator with a manual choice to continue, re-run the analysis step, and/or the like). For instance, in an MS or LC-MS system, logic flow may facilitate dynamic system suitability, in which each injection may be processed immediately after being acquired and if that injection is out-of-spec then the run is paused and the operator can make a manual decision to continue, rerun the injection, or change the run in some other way.

At block 310, logic flow 300 may determine whether the method is complete. If more method segments are required and/or desired for the method, then logic flow may return to block 306 to create a method segment. If the method is complete, logic flow 310 may generate a method file 312, for example, that may be executed via an analytical device.

Figure 4:
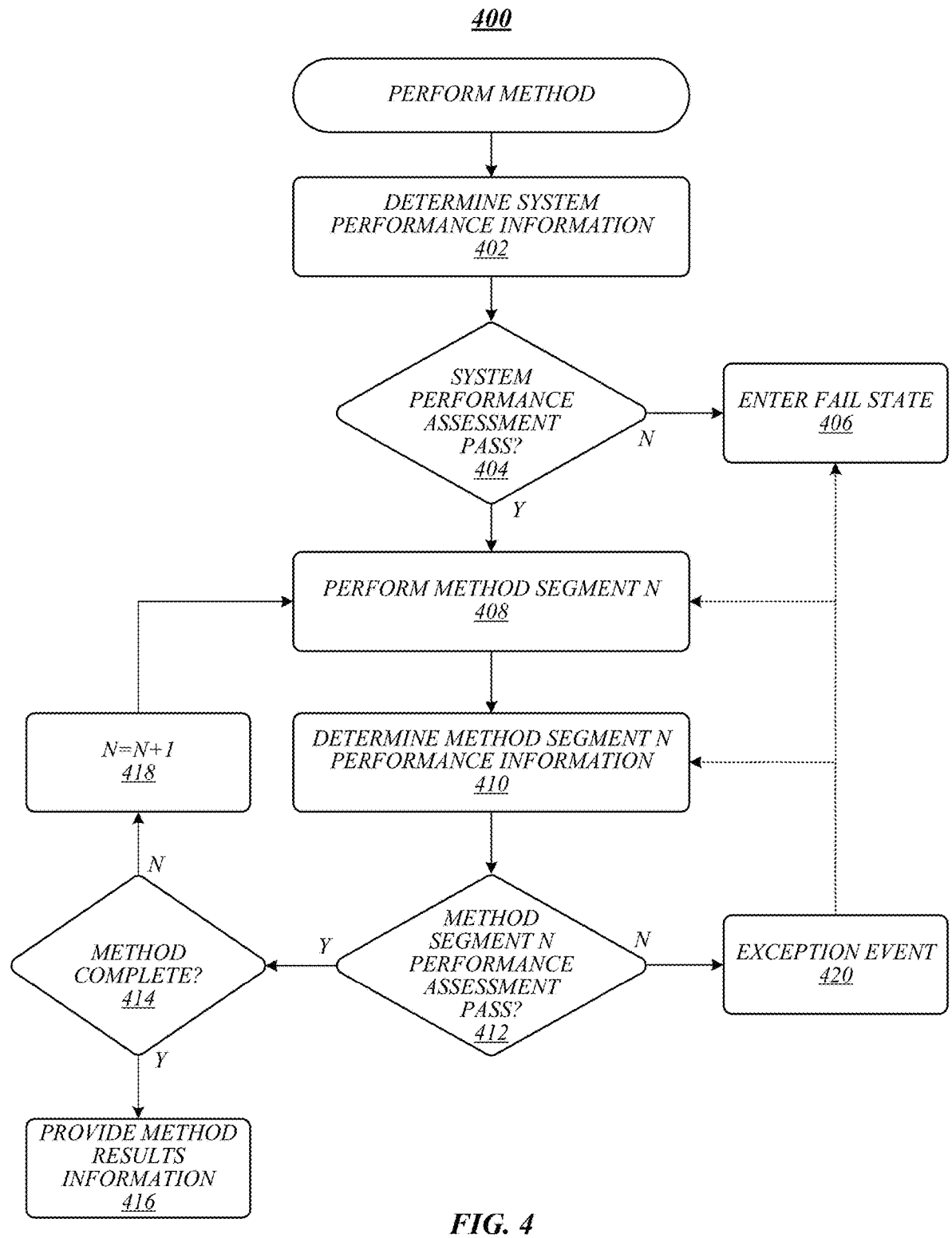
FIG. 4 illustrates an embodiment of a second logic flow.

FIG. 4 illustrates an embodiment of a logic flow 400. Logic flow 400 may be representative of some or all of the operations executed by one or more embodiments described herein, such as computing device 110 and/or components of analytical exchange platform 205. In some embodiments, logic flow 400 may be representative of some or all of the operations of performing a method according to some embodiments.

Logic flow 400 may perform a method by determining system performance evaluation results information at block 402. For example, system performance assessment processes for a method may be performed and performance information (for example, performance information 134) may be determined. For instance, for an MS or LC-MS system, system suitability tests may be performed and the results determined. At block 404, logic flow 400 may determine whether the system performance assessment processes for the method have passed, for instance, by comparing the analysis values with threshold values. If the system performance assessment does not pass, a "hard fail" may be triggered and logic flow 400 may enter a fail state at block 406 (see FIG. 5 for an illustrative exception event logic flow according to some embodiments). In various embodiments, failure of a system performance assessment may indicate that the analytical device is not in a proper operational to perform a method. In some embodiments, the fail state may exit from the workflow of the method and the method run may be designated as a failed run. In some embodiments, if the method segment associated with the system performance processes indicates a failure of a system suitability test, the method may proceed down a path that does not perform sample analysis but, rather, ends at a fail state.

If logic flow 400 determines that the system performance assessment passes at block 404, logic flow may continue to perform method segment N at block 408. Logic flow 400 may determine method segment N performance information at block 410. For example, if performance assessment processes have been defined for method segment N, then they may be executed and the associated performance information determined. At block 410, logic flow 400 may determine whether the performance assessment processes associated with method segment N (which, in some embodiments, may be in different method segments linked to method segment N via conditions and/or the like) have passed. If a performance assessment process has failed, then an exception event may be triggered by logic flow 400 at block 420.

If the performance assessment process has failed, the exception event may cause the method to proceed down one or more different paths (for instance, to handle the failed performance assessment process) defined in the method. For example, in a first path, the performance assessment process may have failed because something is operationally wrong with the analytical device and logic flow 400 may enter the fail state 406. In another example, in a second path, the failure may be due to processing or other cause such that an operator and/or the analytical device (for instance, automatically via control software) may attempt to re-run and/or fix an issue, and logic flow 400 may re-enter the method workflow (for instance, at the failed performance assessment process segment to demonstrate that it passed).

If logic flow 400 determines that the method segment N performance assessment has passed at block 412, logic flow 400 may determine whether the method is complete at block 414. If the method is not complete, then the method step may be incremented at block 418 and the next method segment may be performed at block 408. If the method is complete, logic flow 400 may provide the method information for the analysis at block 416.

Figure 5:
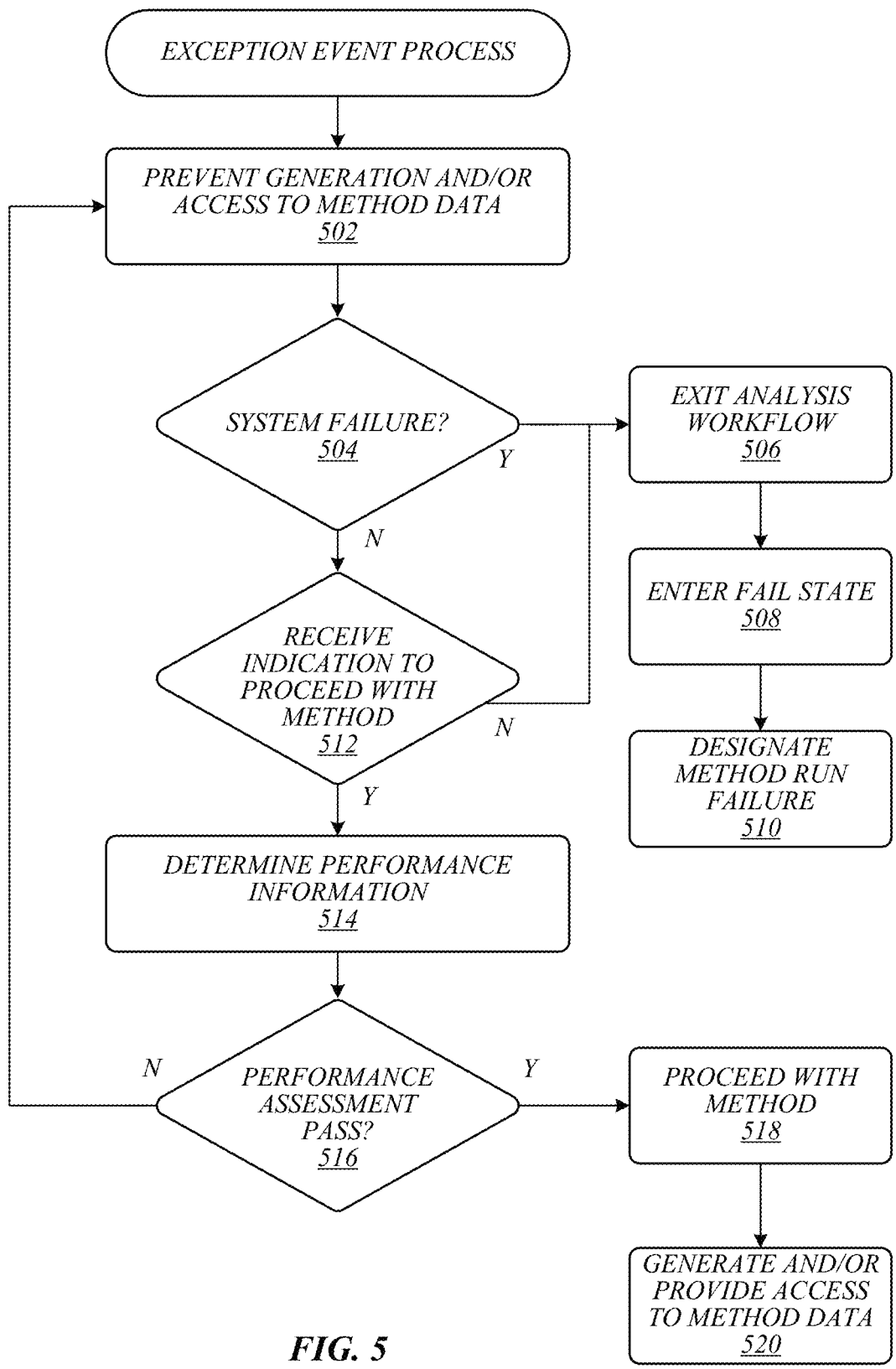
FIG. 5 illustrates an embodiment of a third logic flow.

FIG. 5 illustrates an embodiment of a logic flow 500. Logic flow 500 may be representative of some or all of the operations executed by one or more embodiments described herein, such as computing device 110 and/or components of analytical exchange platform 205. In some embodiments, logic flow 500 may be representative of some or all of the operations for handling exception requests according to some embodiments.

Logic flow 500 may prevent the generation and/or access to method data at block 502 responsive to an exception event. For example, in some embodiments, data processing tasks may be segmented, compartmentalized, or otherwise separated. For example, each method segment and/or portions thereof may be associated with a data processing task, for instance, to generate and/or make accessible data associated with any analyses associated with the method segment. In an MS or LC-MS system embodiment, a first method segment associated with a first sample injection may include a call to a processing task to generate or make accessible method information resulting from analysis of the sample injection. The call to the processing task may be dependent on the absence of an exception request (for example, "if no exception request, then call 'process data' routine"). In various embodiments, methods may operate to only provide processing necessary to perform a task and/or provide information on a particular user interface page (for instance, associated with a sample injection or method segment). In this manner, data may be inaccessible to a user unless the appropriate data quality assurances (for instance, performance assessment processes) associated with the data have passed.

Accordingly, sample data associated with a failed performance assessment process (for instance, failed state sample data) may not be generated and/or made accessible. In various embodiments, failed state sample data may be left in a "raw" or unprocessed state (for instance, not converted to a state readable by an operator, such as a chromatogram or spectra) that may not be readily usable by an operator. Therefore, in some embodiments, users may be actively prohibited from adjusting or manipulating data to pass system suitability or otherwise preventing misuse of suspect data.

At block 504, logic flow 500 may determine whether the exception event is associated with a system failure (for instance, a critical-level exception). For example, a system failure may include failure of a performance assessment process (for instance, system suitability) that indicates that the analytical device is not operating properly. If a system failure is detected, logic flow 500 may exit analysis workflow at block 506, enter a fail state at block 508, and/or designate the method run as a failure at block 510.

If logic flow 500 determines that the exception event is not a system failure (for instance, a non-critical-level exception) at block 504, logic flow 500 may wait to receive an indication to proceed with the method at block 512. For example, an operator may provide input indicating that the method should continue, for instance, by re-running the failed method segment, performing a maintenance method segment, and/or the like. In some embodiments, if logic flow 500 does not receive an indication to proceed at block 512, logic flow 500 may proceed down the same or similar path as a system failure 504.

At block 514, responsive to receiving an indication to proceed with the method at block 512, logic flow 500 may determine performance information, for instance, from the re-running of a failed performance assessment process, execution of a subsequent method segment, execution of a path of the method segment triggered due to the failure, and/or the like. At block, logic flow 500 may determine whether the performance assessment passed at block 516, for example, associated with the re-running of a failed performance assessment process, execution of a subsequent method segment, execution of a path of the method segment triggered due to the failure, and/or the like. If logic flow 500 determines that the performance assessment has passed at block 516, logic flow 500 may proceed with the method at block 518 and generate and/or provide access to the resulting method data at block 520. In some embodiments, logic flow may proceed with the method at block 518, but may not generate and/or provide access to the resulting method data at block 520. For example, in various embodiments, the method may continue at block 518 but the resulting data may not be generated and/or access may not be granted to the accessed data. In exemplary embodiments, a data unlocking event may be required to access non-generated and/or inaccessible data. A data unlocking event may include authorization by an administrator or other authorized user, a designation or flagging of the data as being associated with a failed performance assessment process, and/or the like.

If logic flow 500 determines that the performance assessment has not passed at block 516, logic flow 500 may proceed back to block 502 to re-perform the exception event process. In some embodiments, failure of a performance assessment process a threshold number of times may be designated as a system failure.

Figure 6A:
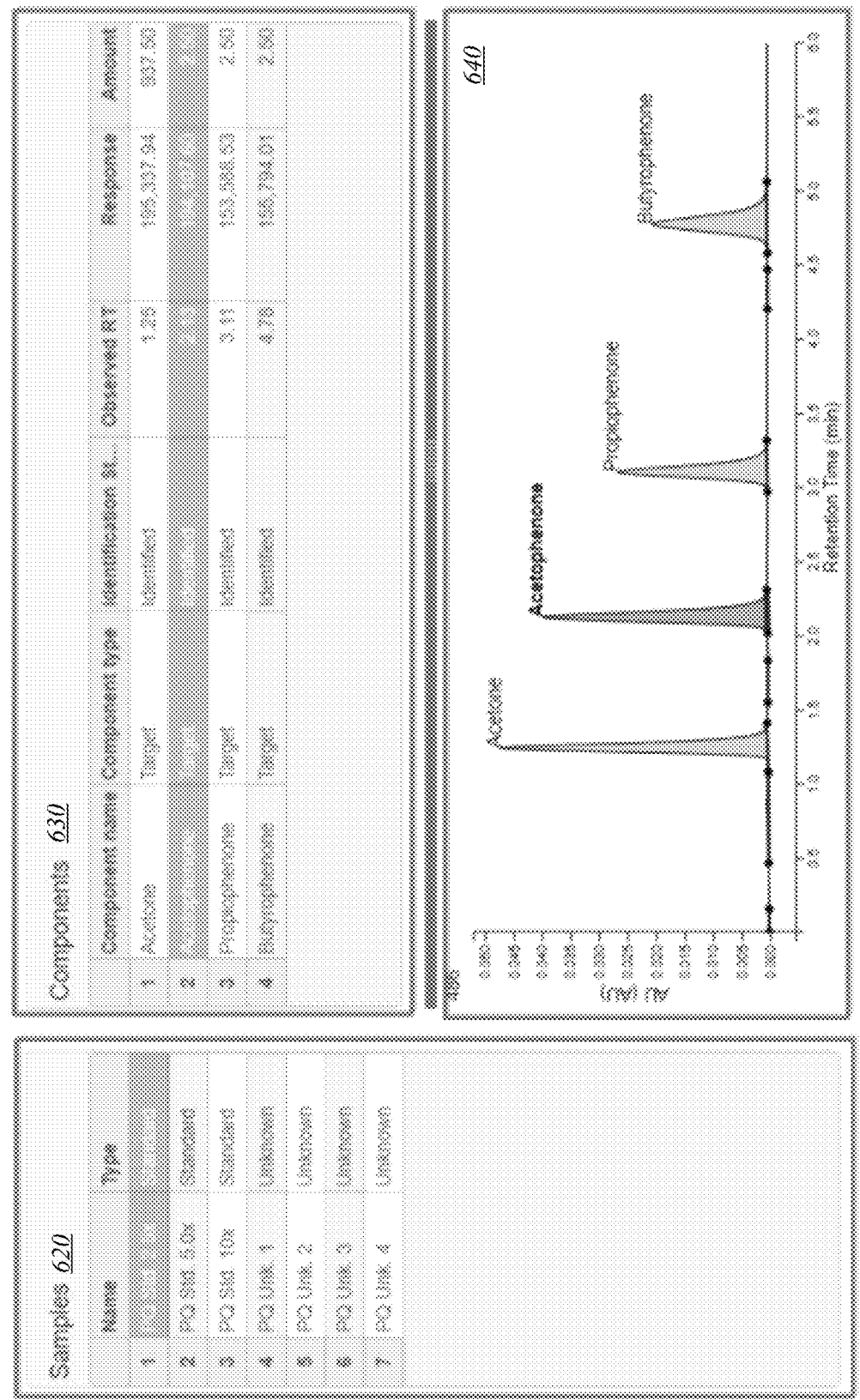
FIGS. 6A-6C depict illustrative screen images from an analytical services application according to some embodiments.
Figure 6B:
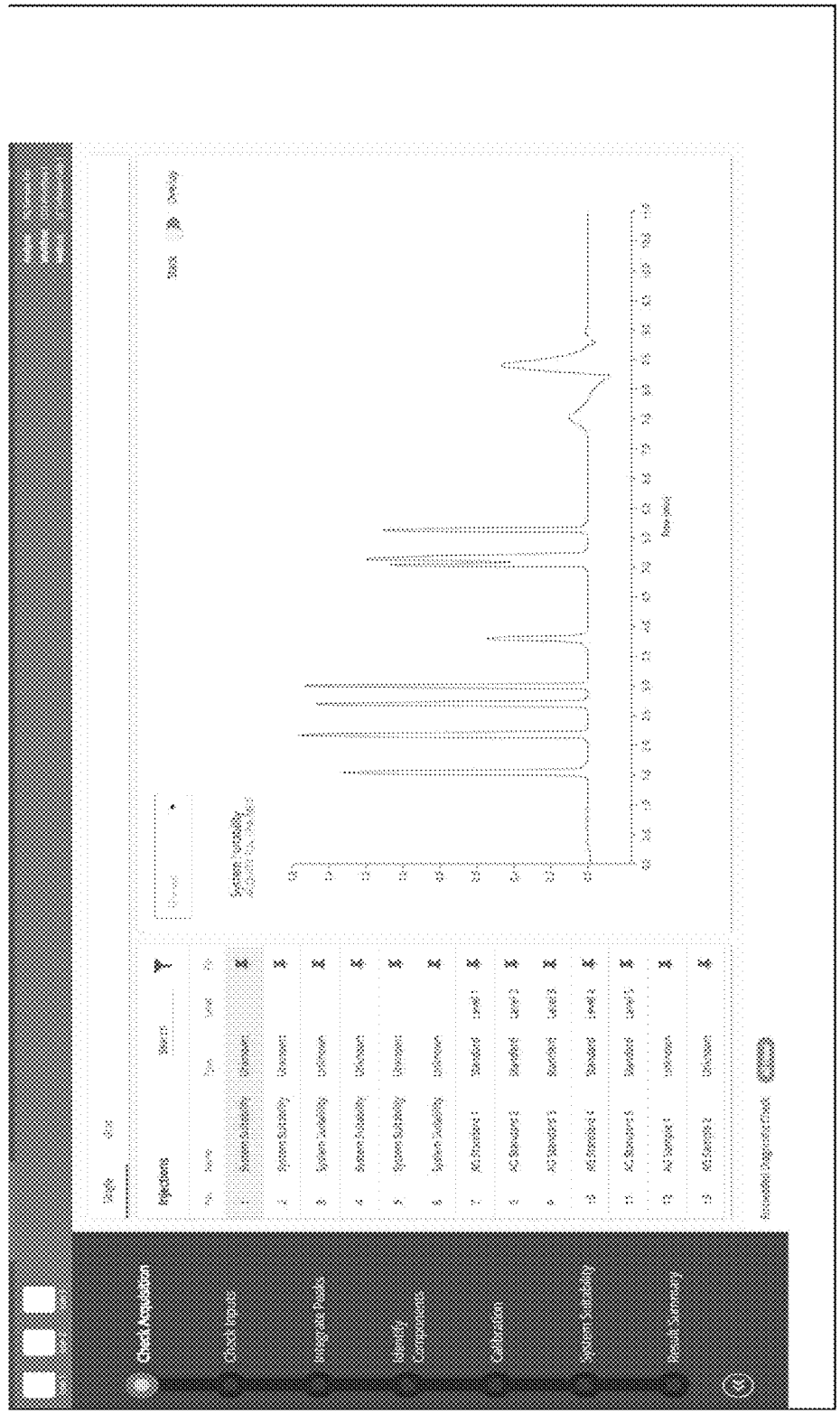
Figure 6C:
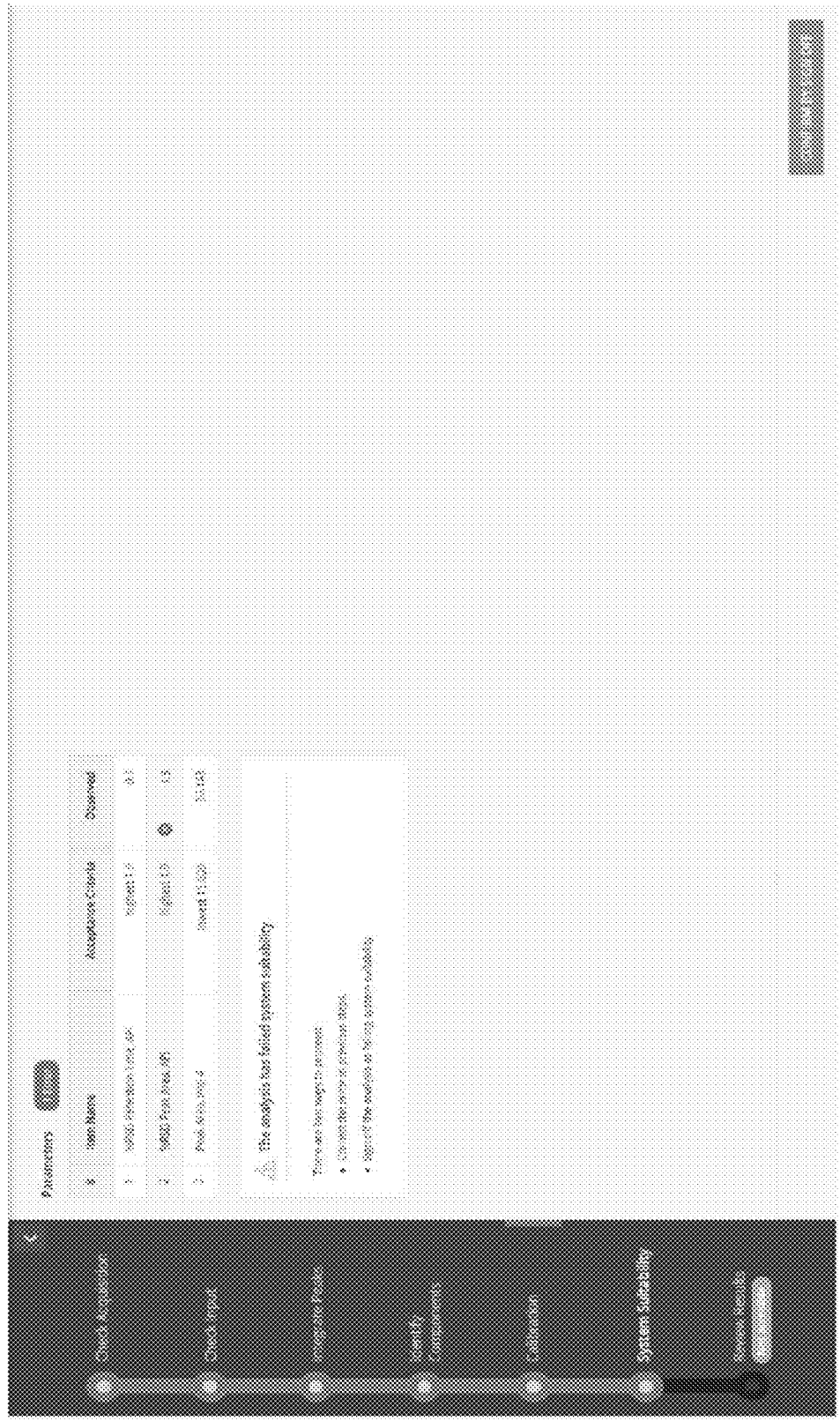

FIGS. 6A-6C depict illustrative screen images from an analytical services application according to some embodiments. In various embodiments, the analytical services application may be for an LC-MS system. FIG. 6A depicts screen image 605 with a sample window 620 a components window 630, and a chromatogram window 640. Samples window 620 may present injections, for example, associated with an analysis method. Components window 630 may operate to show identified components in a selected injection. Chromatogram window 640 may show the trace for the selected injection. In some embodiments, when a user selects an injection, components window 630 may load components in that injection and automatically selects the first line or previously selected component. In various embodiments, chromatogram window 640 may operate to fetch and render traces for a component identifier (ID) associated with the selected component.

FIG. 6B depicts a check acquisition screen image 650 according to some embodiments. As shown in FIG. 6B, injections may include system suitability injections, standard injections, and/or sample injections. Embodiments are not limited in this context. FIG. 6C depicts a system suitability screen image 660 according to some embodiments. As shown in FIG. 6C failed parameters of a system suitability test or injection may be visually indicated to a user.

Figure 7:
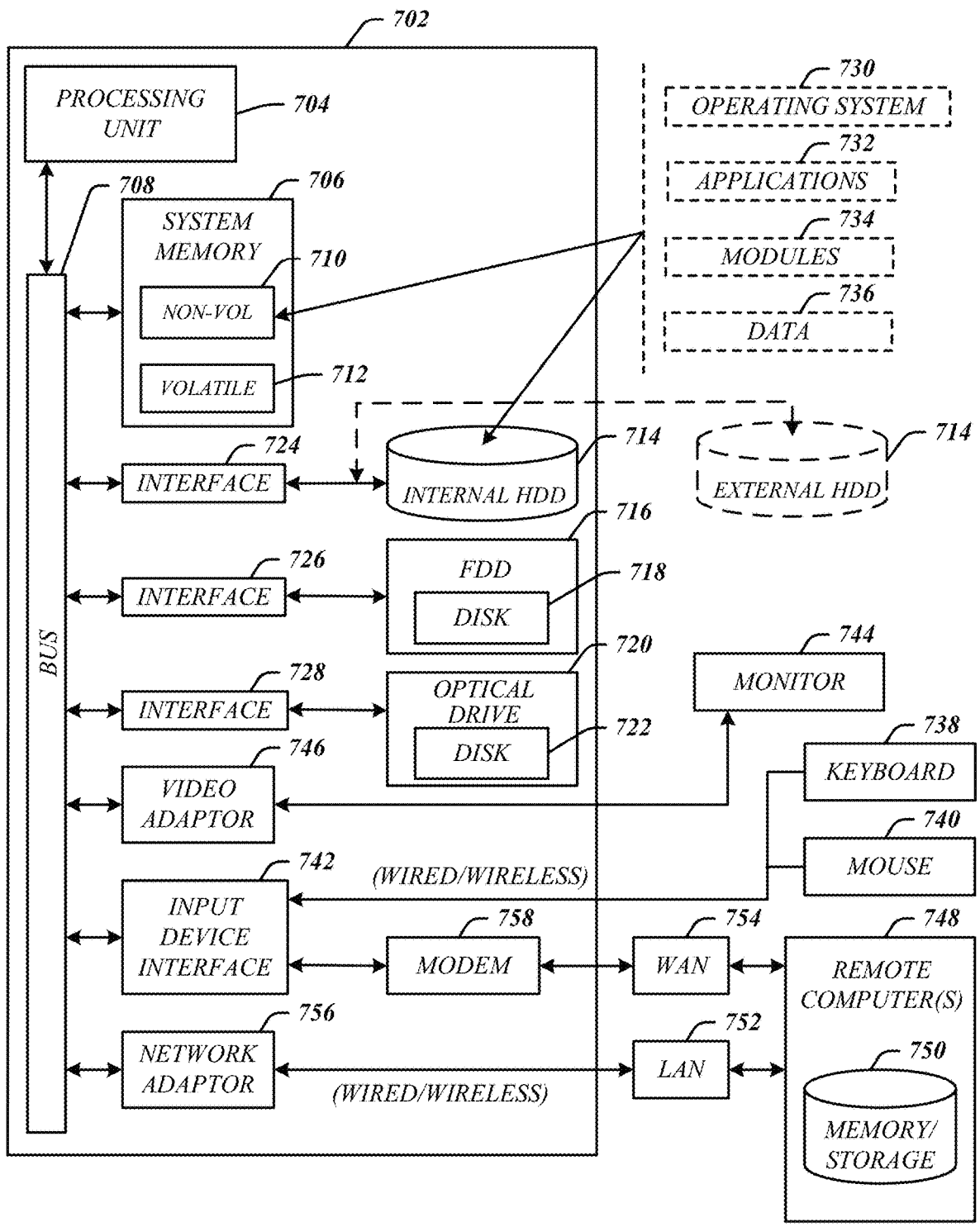
FIG. 7 illustrates an embodiment of a computing architecture.

FIG. 7 illustrates an embodiment of an exemplary computing architecture 700 suitable for implementing various embodiments as previously described. In various embodiments, the computing architecture 700 may comprise or be implemented as part of an electronic device. In some embodiments, the computing architecture 700 may be representative, for example, of apparatus 205, 305, and/or 405. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 704, a system memory 706 and a system bus 707. The processing unit 704 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multiprocessor architectures may also be employed as the processing unit 704.

The system bus 707 provides an interface for system components including, but not limited to, the system memory 706 to the processing unit 704. The system bus 707 can be any of several types of bus structure that may further interconnect to a memory bus (with or without a memory controller), a peripheral bus, and a local bus using any of a variety of commercially available bus architectures. Interface adapters may connect to the system bus 707 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal (or external) hard disk drive (HDD) 714, a magnetic floppy disk drive (FDD) 716 to read from or write to a removable magnetic disk 717, and an optical disk drive 720 to read from or write to a removable optical disk 722 (e.g., a CD-ROM or DVD). The HDD 714, FDD 716 and optical disk drive 720 can be connected to the system bus 707 by a HDD interface 724, an FDD interface 726 and an optical drive interface 727, respectively. The HDD interface 724 for external drive implementations can include at least one or both of Universal Serial Bus (USB) and IEEE 1374 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. In one embodiment, the one or more application programs 732, other program modules 734, and program data 736 can include, for example, the various applications and/or components of apparatus 105, 205, 305, and/or 405.

A user can enter commands and information into the computer 702 through one or more wire/wireless input devices, for example, a keyboard 737 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 704 through an input device interface 742 that is coupled to the system bus 707, but can be connected by other interfaces such as a parallel port, IEEE 1394 serial port, a game port, a USB port, an IR interface, and so forth.

A monitor 744 or other type of display device is also connected to the system bus 707 via an interface, such as a video adaptor 746. The monitor 744 may be internal or external to the computer 802. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 747. The remote computer 747 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 757, or is connected to a communications server on the WAN 754, or has other means for establishing communications over the WAN 754, such as by way of the Internet. The modem 757, which can be internal or external and a wire and/or wireless device, connects to the system bus 707 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus, comprising:
at least one memory; and
logic coupled to the at least one memory, the logic to:
generate an analysis method to be performed by an analytical device, the analysis method comprising a plurality of method segments comprising at least one performance assessment process and at least one sample analysis process, the at least one performance assessment process comprising a system suitability test, and
link the at least one performance assessment process with the at least one sample analysis process.

2. The apparatus of claim 1, the at least one analytical instrument comprising at least one of a liquid chromatography (LC) system, a gas chromatography (GC) system, a mass analyzer system, a mass spectrometer (MS) system, an ion mobility spectrometer (IMS) system, a high-performance liquid chromatography (HPLC) system, a ultra-performance liquid chromatography (UPLC) system, a ultra-high performance liquid chromatography (UHPLC) system, or any combination thereof.

3. The apparatus of claim 2, the at least one sample analysis process comprising a sample injection.

4. The apparatus of claim 1, the analysis method comprising a plurality of paths,
the logic to determine one of the plurality of paths for execution by the analytical device based on results of the at least one performance assessment process.

5. The apparatus of claim 1, the logic to cause an exception event responsive to the at least one performance assessment process being outside of a threshold.

6. The apparatus of claim 5, the logic to prevent generation or access to data of the at least one sample analysis processes linked to the exception event.

7. The apparatus of claim 6, the logic to cause the analytical device to enter a fail state responsive to the exception event being a critical level exception.

8. The apparatus of claim 6, the logic to proceed with the method and prevent generation or access to data of the at least one sample analysis processes linked to the exception event responsive to the exception event being a non-critical level exception.

9. The apparatus of claim 6, the logic to re-run the at least one performance assessment process associated with the exception event responsive to the exception event being a non-critical level exception.

10. A method, comprising:
generating an analysis method to be performed by an analytical device, the analysis method comprising a plurality of method segments comprising at least one performance assessment process and at least one sample analysis process, the at least one performance assessment process comprising a system suitability test; and
linking the at least one performance assessment process with the at least one sample analysis process.

11. The method of claim 10, the analytical device comprising one of a mass spectrometry (MS) system or a liquid chromatography-mass spectrometry (LC-MS) system.

12. The method of claim 11, the at least one sample analysis process comprising a sample injection.

13. The method of claim 10, the analysis method comprising a plurality of paths,
comprising determining one of the plurality of paths for execution by the analytical device based on results of the at least one performance assessment process.

14. The method of claim 10, comprising causing an exception event responsive to the at least one performance assessment process being outside of a threshold.

15. The method of claim 14, comprising preventing generation or access to data of the at least one sample analysis processes linked to the exception event.

16. The method of claim 15, comprising causing the analytical device to enter a fail state responsive to the exception event being a critical level exception.

17. The method of claim 15, comprising proceeding with the method and preventing generation or access to data of the at least one sample analysis processes linked to the exception event responsive to the exception event being a non-critical level exception.

18. The method of claim 15, comprising re-running the at least one performance assessment process associated with the exception event responsive to the exception event being a non-critical level exception.

* * * * *